(12) United States Patent
Banerjee

(10) Patent No.: US 7,349,392 B2
(45) Date of Patent: Mar. 25, 2008

(54) ASSIGNING IP ADDRESSES IN AN INTERNET DATA CENTER

(75) Inventor: Sujata Banerjee, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1212 days.

(21) Appl. No.: 09/953,541

(22) Filed: Sep. 14, 2001

(65) Prior Publication Data

US 2003/0053441 A1    Mar. 20, 2003

(51) Int. Cl.
  *H04L 12/28* (2006.01)
  *H04L 12/56* (2006.01)
  *G06F 15/16* (2006.01)

(52) U.S. Cl. .................... 370/392; 709/245

(58) Field of Classification Search ........ 370/389–392, 370/466–467, 473–474; 709/220–227, 245
See application file for complete search history.

(56) References Cited

U.S. PATENT DOCUMENTS 5,835,723 A * 11/1998 Andrews et al. ............ 709/226
6,693,878 B1 * 2/2004 Daruwalla et al. .......... 370/235
6,697,360 B1 * 2/2004 Gai et al. .................... 370/389
6,792,474 B1 * 9/2004 Hopprich et al. ........... 709/245
7,197,549 B1 * 3/2007 Salama et al. .............. 709/223

OTHER PUBLICATIONS

Cooper, Geof. Recursive subnet. www-mice.cs.ucl.ac.uk/multimedia/misc/tcp_ip/8705.mm.www/0273.html, Thursday, Mar. 9, 2000, p. 1.*
Y. Rekhter, B., Moskowitz, D. Karrenberg, G. J. de Groot, E. Lear, "Address Allocation for Private Internets," RFC 1918, Feb. 1996.
R.T. Braden, J. Postel, "Requirements for Internet gateways," RFC 1009, Jun. 1987.
T. Pummill, B. Manning, "Variable Lengths Subnet Table For IPv4," RFC 1878, Dec. 1995.
V. Fuller, T. Li, J. Yu, K. Varadhan, "Classless Inter-Domain Routing (CIDR) : an Address Assignment and Aggregation Strategy," RFC 1519, Sep. 1993.

* cited by examiner

*Primary Examiner*—Seema Rao
*Assistant Examiner*—Jianye Wu

(57) ABSTRACT

An IP address assignment scheme is described. The IP address assignment scheme is well suited for enabling an Internet Data Center (IDC) to assign IP addresses to its customers such that the IDC's network address space is efficiently utilized. The IP address assignment scheme utilizes variable length subnetting and class-less addressing. Moreover, the IP address assignment scheme ensures that customers are provided sufficient IP addresses for the customers' future expansion needs.

28 Claims, 7 Drawing Sheets

ASSIGNING IP ADDRESSES IN AN INTERNET DATA CENTER

BACKGROUND OF THE INVENTION

1. Field of the Invention

The present invention generally relates to Internet Protocol (IP) addresses. More particularly, the present invention relates to the task of assigning IP addresses to customers of an Internet Data Center (IDC).

2. Related Art

The Internet is a collection of networks whose users communicate with each other. Each communication carries the address of the source and the destination networks and the particular machine within the network associated with the user or the host computer at each end. This address is called the Internet Protocol (IP) address. The IP address is 32 bits long. Moreover, the IP address has two parts: the network part identifies the network number and the host part identifies the specific machine or host (e.g. computer machine, networking machine, storage machine, etc.) within the network.

A subnet is an identifiably separate part of an organization's network. Typically, a subnet may represent all the machines at one geographic location, in one building, on the same local area network (LAN), etc. Having an organization's network divided into subnets allows it to be connected to the Internet with a single network number address. Without subnets, an organization could get multiple connections to the Internet, one for each of its physically separate subnets, but this would require an unnecessary use of the limited number of network numbers the Internet has to assign. It would also require that Internet routing tables on gateways outside the organization would need to know about and have to manage routing that could be handled within an organization.

A portion of the bits of the host part of the IP address can be used to identify a specific subnet. Effectively, the IP address then contains three parts: the network number, the subnet number, and the machine or host number. The 32-bit IP address is often depicted as a dot address—that is, four groups of decimal digits separated by periods. The notation 130.5.5.25 is an example of an IP address. The decimal numbers 130, 5, 5, and 25 each represent a separate binary number. The above IP address is the string of 0s and 1s: 10000010.00000101.00000101.00011001 (binary).

Typically, an Internet Data Center (IDC) has a dynamic infrastructure of machines (e.g. computer machine, networking machine, storage machine, etc.) which fulfill the various needs of a diverse range of customers. IP addresses from the IDC's network address space are assigned to the machines associated with each customer. In general, a fixed number of IP addresses are assigned for each customer's machine needs. Customers have unknown growth patterns and may experience rapid growth over time. Further, Web promotions or other such sporadic events may cause a temporary surge in the customer equipment or machine needs. Thus, equipment or machine needs presented by the customer in the initial contract with the IDC can only be taken as a coarse guideline. Further, in this high churn environment, existing customers may leave and new customers may arrive fairly often, thus presenting various IP addressing requirements challenges to the IDC.

Moreover, the IDC may be partitioned into multiple service cores or core subnets. As an example, each core subnet may have a capacity of 20-1200 machines. Customers of various sizes may reside in an IDC service core or core subnet, ranging from very small customers (requiring approximately 10 or fewer machines) to very large customers (requiring a few hundred machines). Customers requiring thousands of machines can occupy multiple IDC service cores or core subnets. On occasion, a custom solution may need to be built for them. Some machines require multiple IP addresses. Based on their capabilities and application needs, some machines may need 3-4 IP addresses. Few machines need more than that.

The conventional IP address assignment scheme for an IDC has several deficiencies. First, the conventional IP address assignment scheme relies on ad hoc partitioning of IP addresses for distribution to customers, preventing automation of the IP address assignment scheme. Secondly, the conventional IP address assignment scheme sometimes provides insufficient IP addresses for the customer's future expansion needs, requiring the costly and time consuming task of renumbering (or changing) the IP addresses assigned to the customer's machines to keep up with the customer's growth. Lastly, the conventional IP address assignment scheme sometimes provides an oversupply of IP addresses to the customer, leading to inefficient utilization of the IDC's network address space.

SUMMARY OF THE INVENTION

An IP address assignment scheme is described. The IP address assignment scheme is well suited for enabling an Internet Data Center (IDC) operator to assign IP addresses to its customers such that the IDC's network address space is efficiently utilized. The IP address assignment scheme utilizes variable length subnetting and class-less addressing. Moreover, the IP address assignment scheme ensures that customers are provided sufficient IP addresses for the customers' future expansion needs.

Typically, the majority of machines in the IDC will not need public or global IP addresses. In an embodiment, the IDC's network address space comprises a 10.x/8-bit prefix private IP address space, whereas the 10.x/8-bit prefix private IP address space includes the IP addresses from 10.0.0.0 to 10.255.255.255 conventionally.

According to the IP address assignment scheme, the IDC first receives the customer's requirements. The customer's requirements include a number of requested subnets and a requested address size for each requested subnet. The IDC selects one of a plurality of core subnets in its network address space, whereas each core subnet is partitioned into a plurality of top-level subnets and whereas each top-level subnet is partitioned into one or more predefined subnets or IP address bins. Moreover, the IDC determines an address demand value for the customer based on the requested address sizes of the requested subnets. The IDC selects a particular predefined subnet or IP address bin having unassigned IP addresses of the selected core subnet based on the address demand value. Next, for each requested subnet, the IDC assigns a subnet and a corresponding IP address size using the particular predefined subnet or IP address bin.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments

Figure 1:
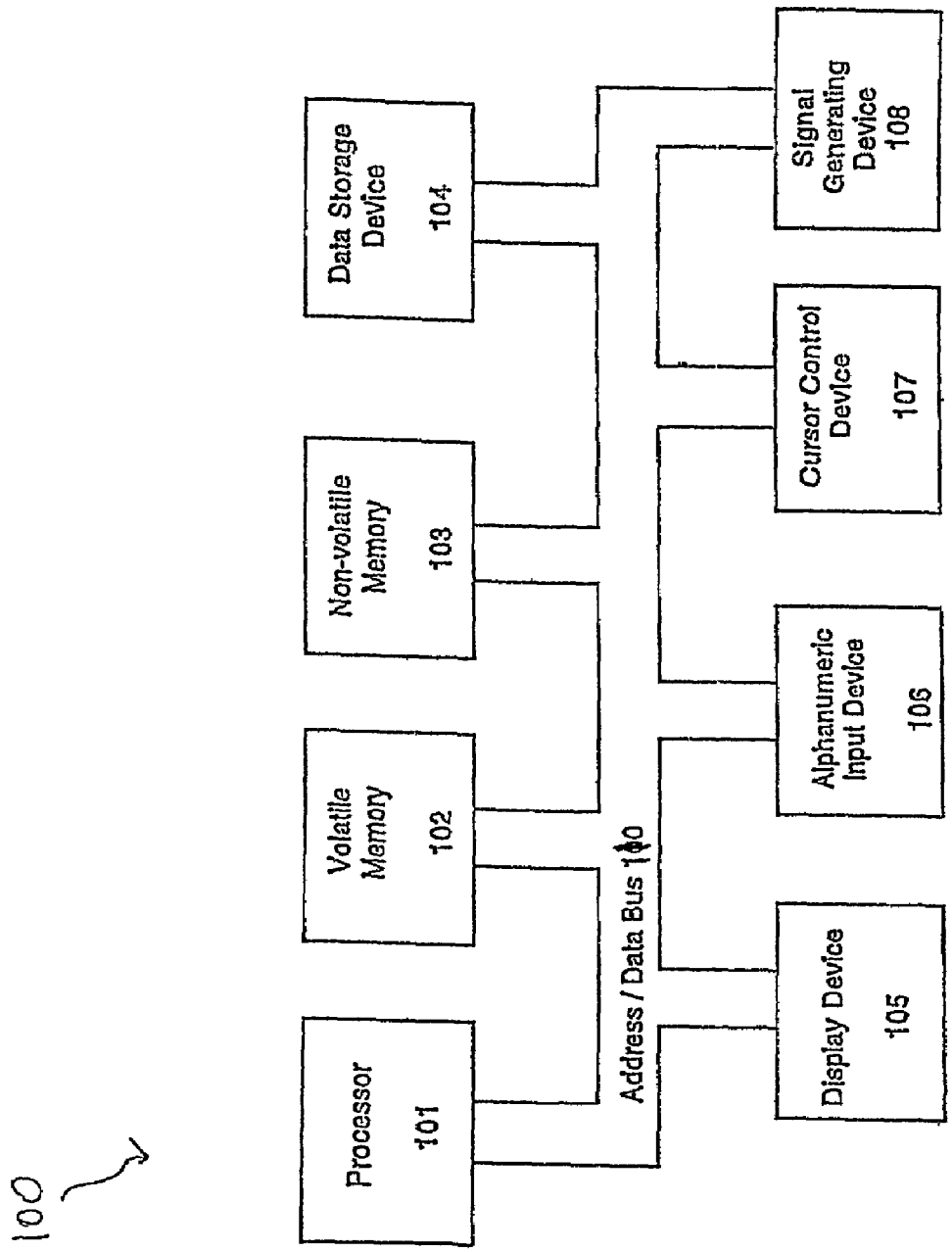
FIG. 1 illustrates an exemplary computer system on which embodiments of the present invention may be practiced.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, a variety of terms are discussed that refer to the actions and processes of an electronic system or a computer system, or other electronic computing device/system. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical, mechanical, or quantum computers.

Exemplary Computer System Environment

Aspects of the present invention can be implemented or executed on a computer system or any other computational system. Although a variety of different computer systems can be used with the present invention, an exemplary computer system 100 is shown in FIG. 1.

With reference to FIG. 1, portions of the present invention are comprised of computer-readable and computer executable instructions which reside, for example, in computer-usable media of an electronic system such as the exemplary computer system. FIG. 1 illustrates an exemplary computer system 100 on which embodiments of the present invention may be practiced. It is appreciated that the computer system 100 of FIG. 1 is exemplary only and that the present invention ban operate within a number of different computer systems including general-purpose computer systems and embedded computer systems.

Computer system 100 includes an address/data bus 110 for communicating information, a central processor 101 coupled with bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Exemplary computer system 100 also includes a data storage device 104 ("disk subsystem") such as a magnetic or optical disk and disk drive coupled with the bus 110 for storing information and instructions. Data storage device 104 can include one or more removable magnetic or optical storage media (e.g., diskettes, tapes) which are computer readable memories. Memory units of computer system 100 include volatile memory 102, non-volatile memory 103 and data storage device 104.

Exemplary computer system 100 can further include a signal generating device 108 (e.g., a network interface card "NIC") coupled to the bus 110 for interfacing with other computer systems. Also included in exemplary computer system 100 of FIG. 1 is an alphanumeric input device 106 including alphanumeric and function keys coupled to the bus 110 for communicating information and command selections to the central processor 101. Exemplary computer system 100 also includes a cursor control or directing device 107 coupled to the bus 110 for communicating user input information and command selections to the central processor 101. A display device 105 can also be coupled to the bus 110 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two-dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

IP Address Assignment Scheme

The IP address assignment scheme of the present invention is well suited for enabling an Internet Data Center (IDC) operator to assign IP addresses to its customers such that the IDC's network address space is efficiently utilized. Moreover, the IP address assignment scheme ensures that customers are provided sufficient IP addresses for the customers' future expansion needs.

The IP address assignment scheme utilizes variable length subnetting and class-less addressing. As described above, the notation xxxxxxxx.xxxxxxxx.xxxxxxxx.xxxxxxxx represents an IP address. Variable length subnetting and class-less addressing permits the IDC to assign a subnet to a customer irrespective of the boundaries designated by the periods of the IP address. For example, the notation xxxxxxxx.xxx00000.00000000.00000000 indicates that the first 11 bits of the IP address are used for identifying the subnet and the next 21 bits are used to identify a specific host or machine while the notation xxxxxxxx.xxxxxxxx.xxx00000.00000000 indicates that the first 19 bits of the IP address are used for identifying the subnet and the next 13 bits are used to identify a specific host or machine. The notation (IP address)/m will be utilized to represent a subnet, whereas "m" is the number of bits assigned to identify the subnet. Moreover, the value $2^{(32-m)}$ represents the IP address size of the subnet represented by (IP address)/m. In particular the value $2^{(32-m)}$ represents the number of unique IP addresses that can be created with the subnet (IP address)/m. For instance, the notation 10.1.144.0/21 indicates that in the IP address 10.1.144.0 the first 21 bits of the IP address are used for identifying the subnet and the next 11 bits are used to identify a specific host or machine, whereas the subnet 10.1.144.0/21 has $2^{11}$ unique addresses.

Typically, the majority of machines in the IDC will not need public or global IP addresses. In an embodiment, the IDC's network address space comprises a 10.x/8-bit prefix private IP address space, whereas the 10.x/8-bit prefix private IP address space includes the IP addresses from 10.0.0.0 to 10.255.255.255 conventionally. This allows for a maximum of close to 17 million IP addresses (16,777,216 addresses or $2^{(32-8)}$ addresses) in the IDC's network address space for distribution to the IDC's customers. The IDC's network address space is a very large address space, considering that a 50,000-machine IDC with each machine having 20 IP addresses requires just a million unique addresses.

There are two key issues, however, that make the IP address assignment task interesting: (1) future growth patterns of the IDC's customers are extremely unpredictable and (2) it is very difficult to re-assign IP addresses to a given running and provisioned machine as the IP addresses get embedded in existing applications very quickly. Thus the IP address assignment problem boils down to the following: How do we assign IP address spaces to customers in an efficient manner, allowing for tremendous variability in demand and not having to re-assign the address space of existing customers?

Figure 2:
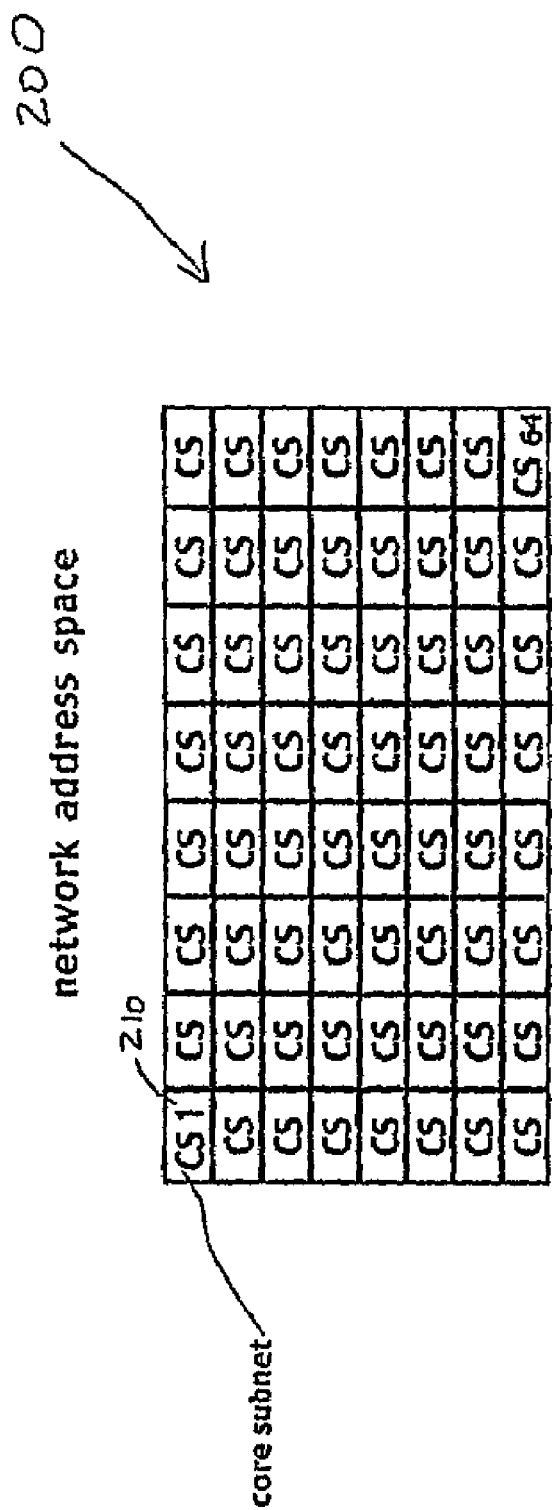
FIG. 2 illustrates a network address space in accordance with an embodiment of the present invention, showing the core subnets.

FIG. 2 illustrates a network address space 200 in accordance with an embodiment of the present invention, showing the core subnets 210. As illustrated in FIG. 2, the IDC's network address space 200 is partitioned into a plurality of service cores or core subnets 210, whereas in the 10.x/8-bit prefix private IP address space 24 bits are available for subnet and host designation. The IP address assignment scheme of the present invention anticipates the presence of extremely diverse customers of widely varying system size requirements (e.g., number of subnets and IP addresses per subnet) and growth requirements in the core subnets 210. Here, the IDC's network address space 200 is partitioned into 64 core subnets 210. In an embodiment, the core subnets 210 have an equivalent IP address size. This partitioning requires 6 bits of the available 24 bits. These 64 core subnets occupy address spaces ranging from 10.0.0.0/14, 10.4.0.0/14,10.8.0.0/14, . . . , 10.252.0.0/14. It should be understood that the IDC's network address space can be partitioned differently. Each core subnet 210 has 18 bits available for subnet and host designation. Hence, 262,144 (or $2^{18}$) unique IP addresses can be formed in each core subnet 210.

Figure 3:
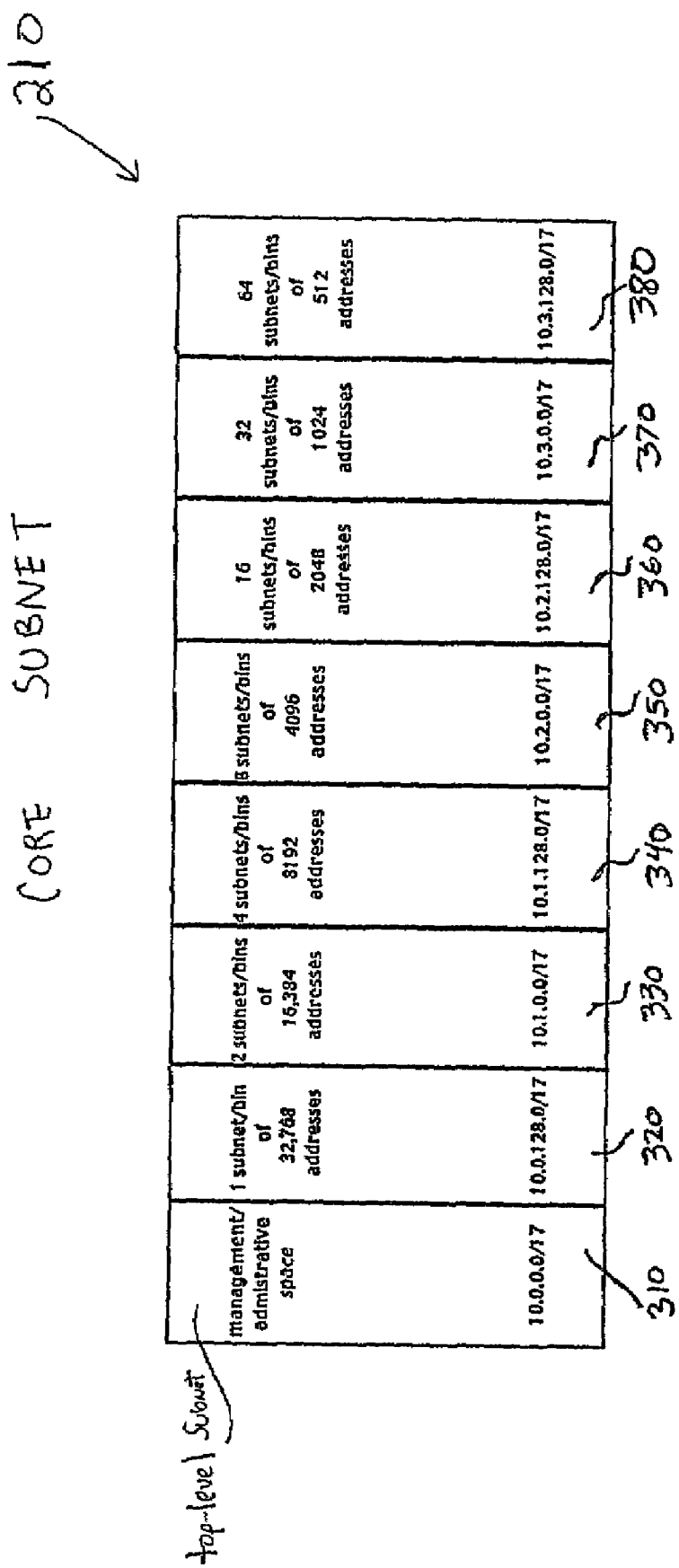
FIG. 3 illustrates a core subnet in accordance with an embodiment of the present invention, showing the top-level subnets.

FIG. 3 illustrates a core subnet 210 in accordance with an embodiment of the present invention, showing the top-level subnets 310-380. As illustrated in FIG. 3, each core subnet 210 of FIG. 2 is partitioned into a plurality of top-level subnets 310-380. This partitioning requires 3 bits of the available 18 bits. Each top-level subnet 310-380 has an address size of 32,768 addresses, whereas 32,768 (or $2^{15}$) unique IP addresses can be formed in each top-level subnet 310-380. It should be understood that the core subnet can be partitioned into a different number of top-level subnets. FIG. 3 illustrates the partitioning of the core subnet 10.0.0.0/14. The 8 top-level subnets 310-380 of the core subnet 10.0.0.0/14 occupy address spaces as follows:

1. 10.0.0.0/17: for first top-level subnet 310,
2. 10.0.128.0/17: for second top-level subnet 320,
3. 10.1.0.0/17: for third top-level subnet 330,
4. 10.1.128.0/17: for fourth top-level subnet 340,
5. 10.2.0.0/17: for fifth top-level subnet 350,
6. 10.2.128.0/17: for sixth top-level subnet 360,
7. 10.3.0.0/17: for seventh top-level subnet 370, and
8. 10.3.128.0/17: for eighth top-level subnet 380.

In an embodiment, the first top-level subnet 310 (or 10.0.0.0/17) is reserved for management/administrative purposes. The other seven top-level subnets 320-380 can be divided and distributed to the IDC's customers. Since variable length subnetting is utilized, a subnet of address size 32,768 or smaller can be formed in each top-level subnet 320-380. In general, the customers that request numerous subnets are given multiple subnets that are "contiguous". In order to allow room for future unexpected expansions, the customers are provided a bigger address space than what is requested by the customer. In order to provide the maximum growth expansion possibility, as customers request subnets in IDC's network address space, they are placed in address spaces as far apart as possible. Since there is partial or negligible forecasting capability of the requirements of the IDC customers, it is possible that a core subnet will have customers of various sizes. For example, there may be several small sized customers, many medium sized customers, and a few large sized customers in a core subnet. Motivated by this, the seven top-level subnets 320-380 are partitioned into different predefined subnets or IP address bins as given below:
1. 10.0.0.0/17: Management/administrative address space, not subnetted further,
2. 10.0.128.0/17: 1 subnet of 32,768 addresses for second top-level subnet 320,
3. 10.1.0.0/17: 2 subnets of 16,384 addresses for third top-level subnet 330,
4. 10.1.128.0/17: 4 subnets of 8192 addresses for fourth top-level subnet 340,
5. 10.2.0.0/17: 8 subnets of 4096 addresses for fifth top-level subnet 350,
6. 10.2.128.0/17: 16 subnets of 2048 addresses for sixth top-level subnet 360,
7. 10.3.0.0/17: 32 subnets of 1024 addresses for seventh top-level subnet 370, and
8. 10.3.128.0/17: 64 subnets of 512 addresses for eighth top-level subnet 380.

It should be understood that the partitioning of the core subnet and the partitioning of the top-level subnets 320-380 can be different than that illustrated in FIG. 3. In fact, the top-level subnets 320-380 can be partitioned into predefined subnets or IP address bins of sizes that best suit the IDC operator's customer base. In particular, the partitioning of the core subnet and the partitioning of the top-level subnets 320-380 can be adaptive based on the IDC operator's experience with customers. For example, if the IDC operator finds that most of the IDC's customers tend to be small, then the partitioning of the top-level subnets can emphasize predefined subnets or IP address bins of sizes such as 512 addresses (e.g., top-level subnet 380) and 1024 addresses (e.g., top-level subnet 370). Moreover, the core subnet can be partitioned into more than or less than eight top-level subnets to best suit the IDC operator's customer base.

According to the IP address assignment scheme of the present invention, the IDC first receives the customer's requirements. The customer's requirements include a number of requested subnets and a requested address size for each requested subnet. The IDC selects one of a plurality of core subnets in its network address space, whereas each core subnet is partitioned into a plurality of top-level subnets and whereas each top-level subnet is partitioned into one or more predefined subnets or IP address bins. Moreover, the IDC determines an address demand value for the customer based on the requested address sizes of the requested subnets. The IDC selects a particular predefined subnet or IP address bin having unassigned IP addresses of the selected core subnet based on the address demand value. Next, for each requested subnet, the IDC assigns a subnet and a corresponding IP address size using the particular predefined subnet or IP address bin.

Figure 4A:
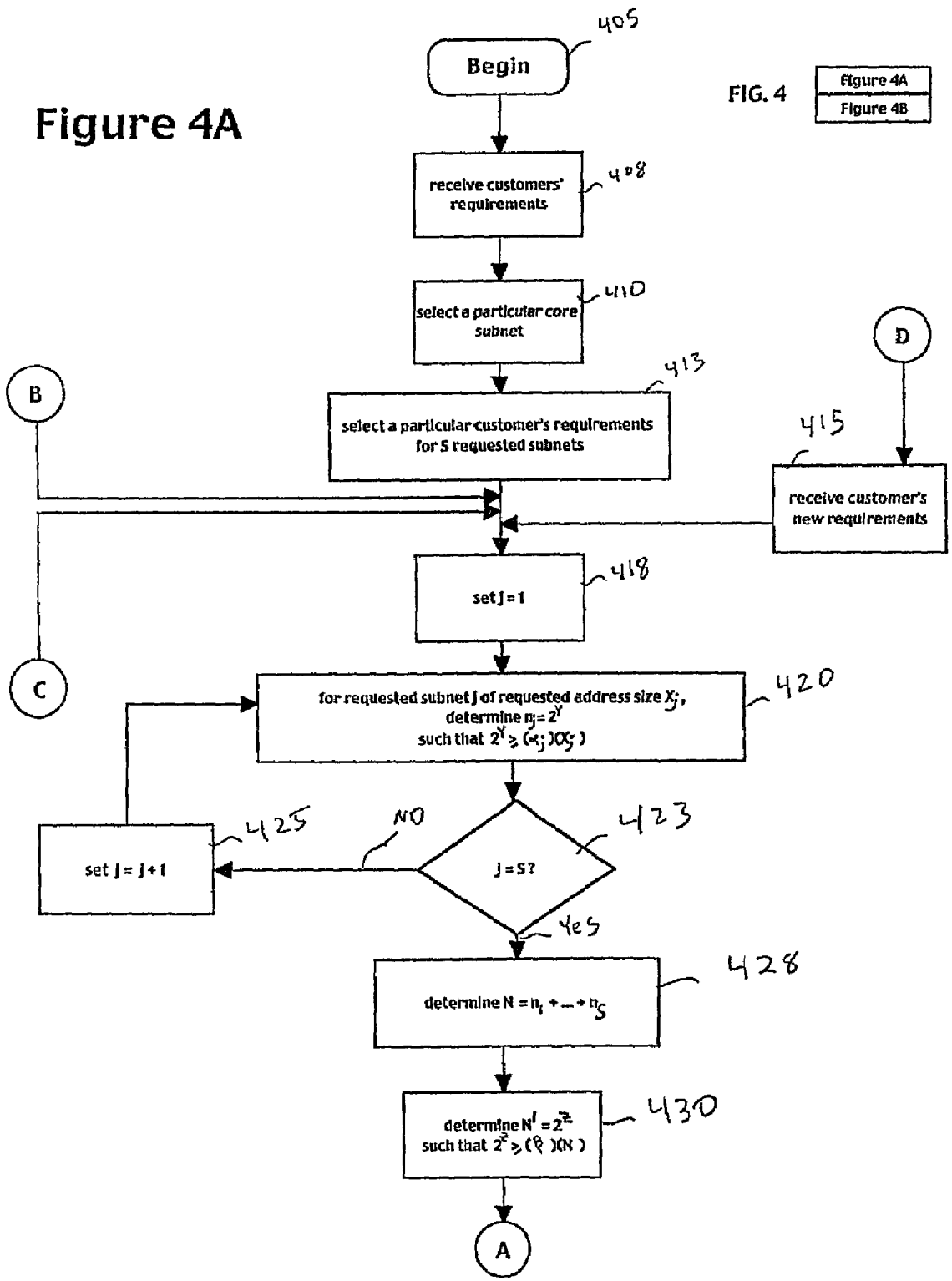
FIG. 4 illustrates a flow chart showing a method of assigning IP addresses in accordance with an embodiment of the present invention.
Figure 4B:
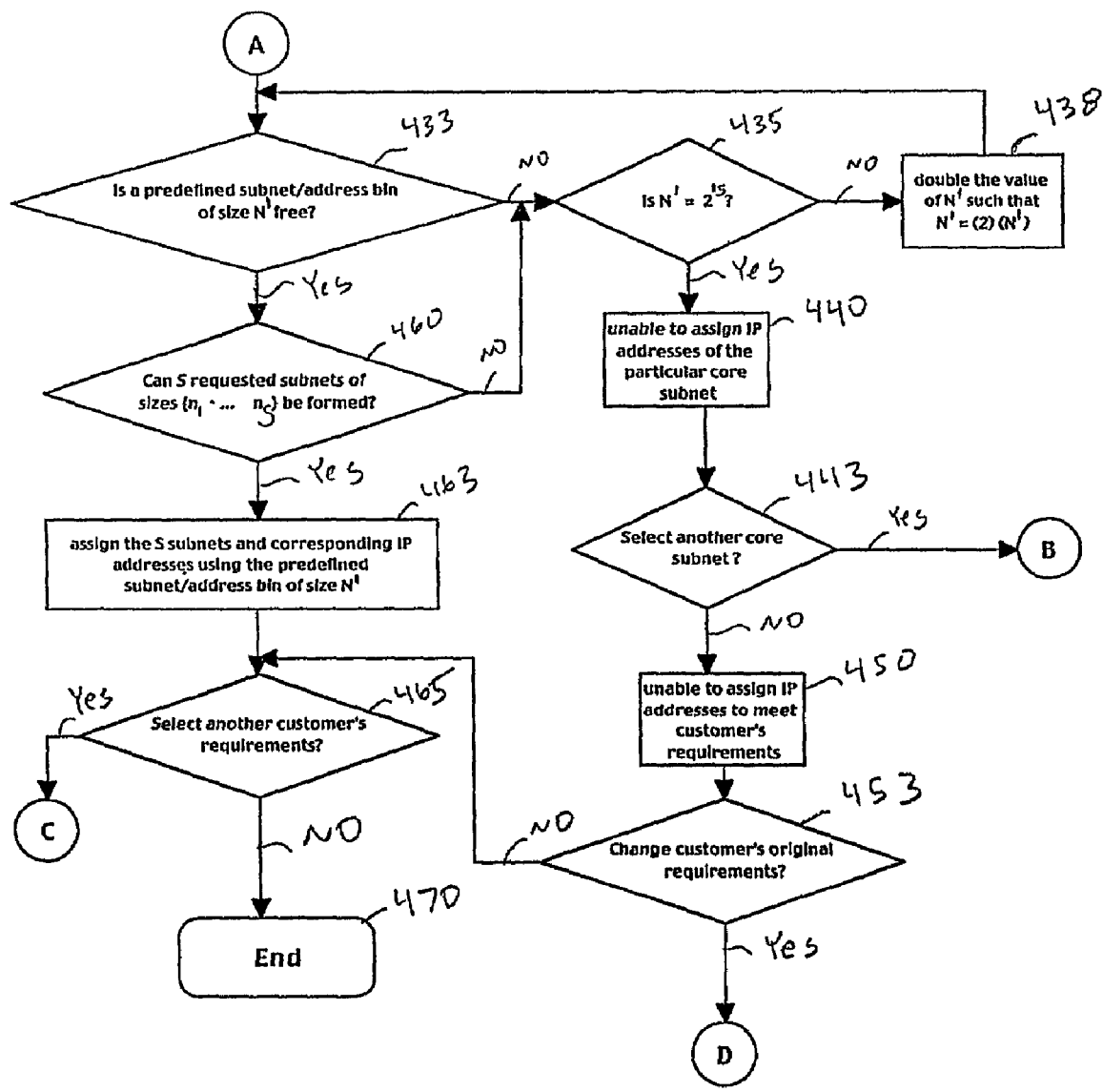

FIG. 4 illustrates a flow chart showing a method of assigning IP addresses in accordance with an embodiment of the present invention. Reference is made to FIGS. 2, 3, 4A, 4B, 5 and 6. Aspects of the method illustrated in FIG. 4 can be implemented with a software application. For example, the method can be coded into a Perl program which takes as input a text file having the requirements of multiple customers and generates an output file having the subnet and IP address space assignments of each customer.

With reference to FIG. 4A, at block 405, the method in accordance with an embodiment of the present invention begins. At block 408, the IDC receives the customers' requirements. Generally, the customer's requirements include a number of requested subnets and a requested address size for each requested subnet. For example, a first customer requires a first requested subnet of 256 IP addresses and a second requested subnet of 256 IP addresses while a second customer requires a first requested subnet of 1024 IP addresses, a second requested subnet of 2048 IP addresses, and a third requested subnet of 4096 IP addresses.

Continuing at block 410, the IDC selects a particular core subnet of the IDC's network address space 200 (FIG. 2). For example, the core subnet 10.0.0.0/14 is selected. Some load balancing could be done such that all available core subnets are equally populated. There may be policy decisions as well as performance and security issues that will impact the assignment of customers to a core subnet. When a specific core subnet is selected to house a customer's address space, the customer is generally assigned an address space that is as far apart from the other existing customer address spaces as possible.

Furthermore, at block 413, a particular customer's requirements is selected. For example, the first customer is selected. The first customer requires S subnets, whereas S=2.

At block 418, the variable j is set to the value j=1. At block 420, for requested subnet j of requested address size $X_j$, the value $n_j = 2^y$ is determined such that $2^y >= (\alpha_j)(X_j)$, whereas y=1, 2, 3, 4, or etc. In other words, the adjusted address size $n_j$ represents a lowest power of 2 that is larger than or equal to a product of the first expansion factor $\alpha_j$ and the requested address size $X_j$. The first expansion factor $\alpha_j$ is used to provide sufficient room for future expansion of the requested subnet j. The first expansion factor $\alpha_j$ can be different for each requested subnet. For the first customer and for the requested subnet 1, if $\alpha_1=1$ and $X_1=256$, then $n_1=256$ (or $2^8$).

At block 423, it is determined whether j=S. If j=S, the method proceeds to block 428. Otherwise, the method proceeds to block 425 where the value j is set to j=j+1 and then proceeds to block 420, where for the first customer and for the requested subnet 2, if $\alpha_2=1$ and $X_2=256$, then $n_2=256$ (or $2^8$).

Moreover, at block 428, $N=\Sigma_{j=1}^{S} n_j$ is determined, whereas N is the unadjusted address demand value. For the first customer, N=512 (or 256+256). At block 430, the value $N^1=2^z$ is determined such that $2^z >= (\beta)(N)$, whereas z=1, 2, 3, 4, or etc. In other words, the address demand value $N^1$ represents a lowest power of 2 that is larger than or equal to a product of the second expansion factor $\beta$ and the unadjusted address demand value N. The second expansion factor $\beta$ is used to provide sufficient room for future expansion of the first customer's needs. For the first customer, if $\beta=1.1$ and N=512, then $N^1=1024$ (or $2^{10}$) since (1.1)(512)=563.

Referring to FIG. 4B, at block 433, it is determined whether a predefined subnet or IP address bin of size $N^1$ is free or has a plurality of unassigned IP addresses. If the predefined subnet or IP address bin of size $N^1$ is free, the method proceeds to block 460. Otherwise, the method proceeds to block 435. At block 435, it is determined whether $N^1=2^{15}$, whereas $2^{15}$ is the maximum address size of the predefined subnets or IP address bins. If $N^1$ does not equal $2^{15}$, the method proceeds to block 438 where the value $N^1$ is set to $N^1=(2)(N^1)$ so that a larger predefined subnet or IP address size bin can be selected and then proceeds to block 433. Otherwise, the method proceeds to block 440 where it is indicated that the IP addresses of the particular core subnet could not be assigned to fulfill the customer's requirements.

Continuing at block 443, it is determined whether to select another core subnet. If another core subnet is selected, the method proceeds to block 418. Otherwise, the method proceeds to block 450 where it is indicated that the IP addresses of the IDC network address space could not be assigned to fulfill the customer's requirements. Thus, the customer's requirements will have to be assigned in a custom manner. Continuing at block 453, it is determined whether to contact customer to change customer's original requirements. If the customer is contacted to change the customer's original requirements, the method proceeds to block 415 (FIG. 4A) where the customer's new requirements are received and then proceeds to block 418.

Otherwise, the method proceeds to block 465.

Referring to block 433 again, if the predefined subnet or IP address bin of size $N^1$ is free, the method proceeds to block 460. At block 460, it is determined whether the S requested subnets of address sizes $n_1 \ldots n_S$ can be formed in the predefined subnet or IP address bin of size $N^1$. As described above, for the first customer, S=2. If the S requested subnets of address sizes $n_1 \ldots n_S$ can be formed in the predefined subnet or IP address bin of size $N^1$, the method proceeds to block 463. Otherwise, the method proceeds to block 435.

Figure 5:
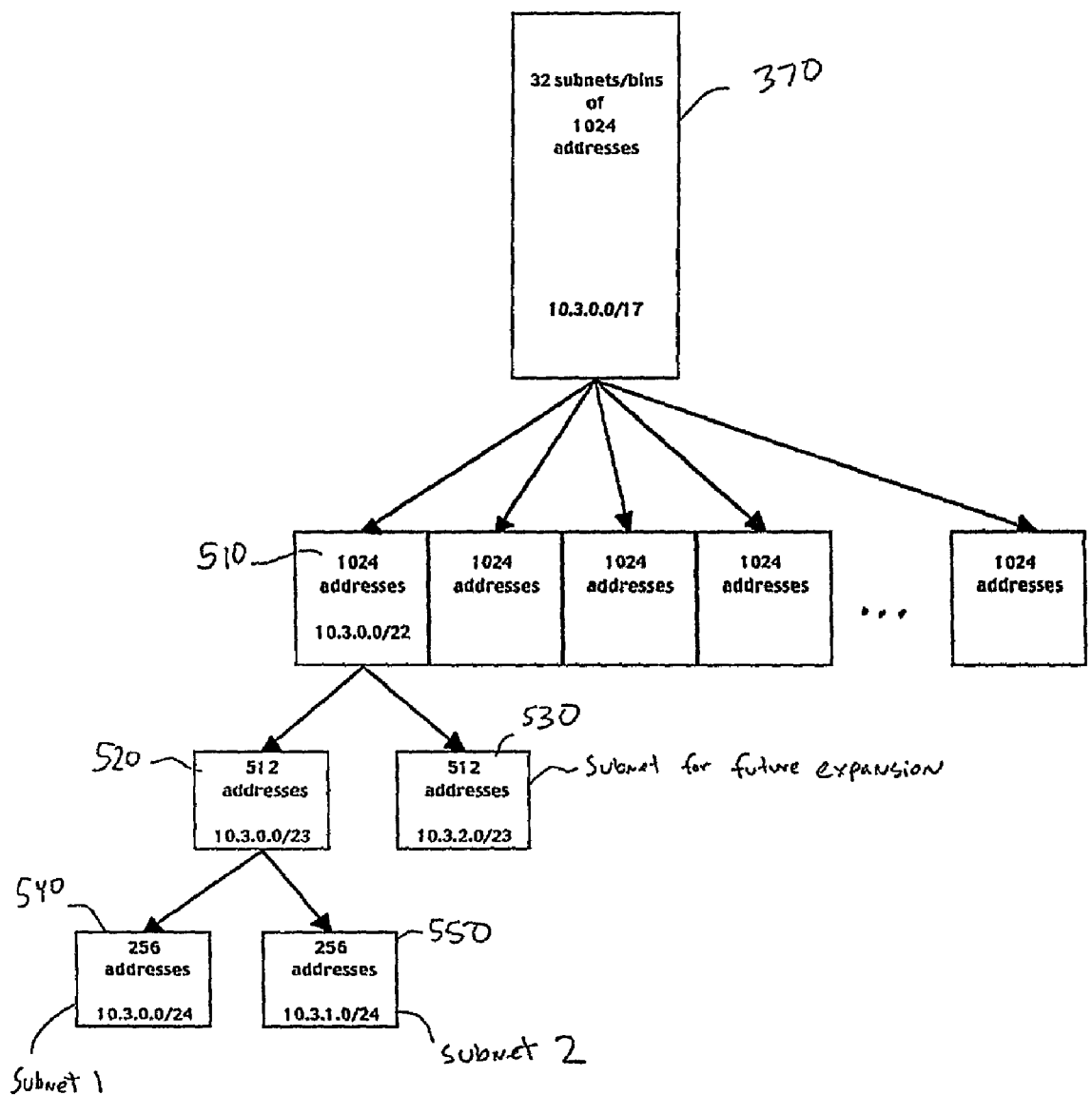
FIG. 5 illustrates a first exemplary IP address assignment to a first customer in accordance with an embodiment of the present invention.

At block 463, for each requested subnet, a subnet and a corresponding IP address size is assigned using the predefined subnet or IP address bin of size $N^1$. FIG. 5 illustrates a first exemplary IP address assignment to the first customer in accordance with an embodiment of the present invention. As described above, the core subnet 10.0.0.0/14 has been selected. Within the core subnet 10.0.0.0/14, the top-level subnet 370 occupying the address space 10.3.0.0/17 is selected. Within the top-level subnet 370, the predefined subnet or IP address bin 510 occupying the address space 10.3.0.0/22 is selected and has 1024 addresses. The predefined subnet or IP address bin 510 is partitioned into subnet 520 and subnet 530 each having 512 addresses. The subnet 520 is partitioned into subnet 540 and subnet 550 each having 256 addresses. Thus, for the first customer, the first requested subnet is assigned the subnet 540 occupying the address space 10.3.0.0/24 and having 256 addresses. The second requested subnet is assigned the subnet 550 occupying the address space 10.3.1.0/24 and having 256 addresses. Moreover, the subnet 530 occupying the address space 10.3.2.0/23 (having 512 IP addresses) is available for the first customer's future expansion.

Referring to FIG. 4B, at block 465 it is determined whether to select another customer's requirements. If another customer's requirements are selected, the method proceeds to block 418. Otherwise, the method proceeds to block 470 and ends.

Figure 6:
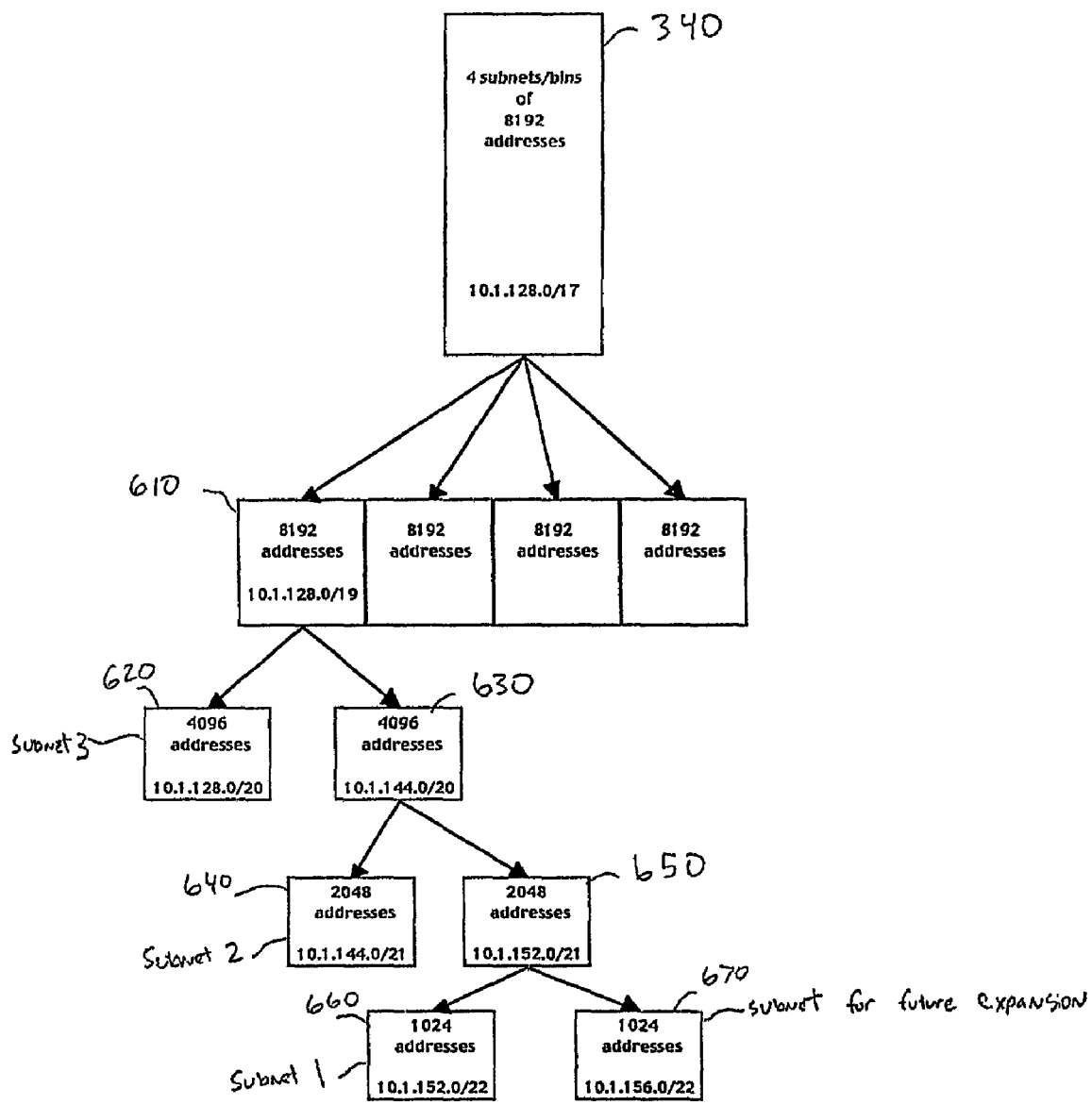
FIG. 6 illustrates a second exemplary IP address assignment to a second customer in accordance with an embodiment of the present invention.

FIG. 6 illustrates a second exemplary IP address assignment to the second customer in accordance with an embodiment of the present invention as illustrated in FIGS. 4A and 4B. As described above, the second customer requires a first requested subnet of 1024 IP addresses, a second requested subnet of 2048 IP addresses, and a third requested subnet of 4096 IP addresses. As described above, the core subnet 10.0.0.0/14 has been selected. Within the core subnet 10.0.0.0/14, the top-level subnet 340 occupying the address space 10.1.128.0/17 is selected. Within the top-level subnet 340, the predefined subnet or IP address bin 610 occupying the address space 10.1.128.0/19 is selected and has 8192 addresses. The predefined subnet or IP address bin 610 is partitioned into subnet 620 and subnet 630 each having 4096 addresses. The subnet 630 is partitioned into subnet 640 and subnet 650 each having 2048 addresses. The subnet 650 is partitioned into subnet 660 and subnet 670 each having 1024 addresses. Thus, for the second customer, the third requested subnet is assigned the subnet 620 occupying the address space 10.1.128.0/20 and having 4096 addresses. The second requested subnet is assigned the subnet 640 occupying the address space 10.1.144.0/21 and having 2048 addresses. The first requested subnet is assigned the subnet 660 occupying the address space 10.1.152.0/22 and having 1024 addresses. Moreover, the subnet 670 occupying the address space 10.1.156.0/22 (having 1024 IP addresses) is available for the second customer's future expansion.

The IP address assignment scheme of the present invention accommodates future expansion needs of the customer with minimal disruption. The address space given to the customer is fairly larger than that which is requested. The customer can give his input on possible expansion in initial contacts with the IDC provider. While the address assignment can be done completely using a software program based on the assignment algorithm described in FIGS. 4A and 4B, human operators can monitor for address space usage anomalies and can override the algorithm manually if necessary. Generally, when a customer leaves the IDC, the predetermined subnet or IP address bin assigned to the customer is returned to the pool of free predetermined subnets or IP address bins.

The IP address assignment scheme of the present invention provides several benefits. It provides an efficient method for partitioning the IDC's network address space. Moreover, it provides a better organization of the IDC's network address space and simplifies the management of the IDC's network address space. Furthermore, the IP address assignment scheme of the present invention facilitates automation of the task of assigning IP addresses by the IDC.

Those skilled in the art will recognize that portions of the present invention may be incorporated as computer instructions stored as computer program code on a computer-readable medium such as a magnetic disk, CD-ROM, and other media common in the art or that may yet be developed.

Finally, aspects of the present invention can be implemented as an application, namely, a set of instructions (e.g., program code) which may, for example, be resident in the random access memory of a computer system. Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. In addition, although the various methods of the present invention described above can be conveniently implemented in a computer system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of allocating Internet Protocol (IP) addresses to a customer of an Internet Data Center (IDC), comprising:
   a) receiving at least one customer requested subnet associated with said customer, each customer requested subnet having a requested address size;
   b) selecting one of a plurality of core subnets in a network address space of said IDC, each core subnet partitioned into a plurality of top-level subnets, each top-level subnet partitioned into one or more predefined subnets;
   c) determining an address demand value based on said requested address size of each customer requested subnet, wherein said determining of said address demand value includes:
      for each customer requested subnet, determining an adjusted address size using said requested address size and a first expansion factor;
      adding each adjusted address size to generate an unadjusted address demand value;
      generating said address demand value using said unadjusted address demand value and a second expansion factor;
   d) selecting a particular predefined subnet having a plurality of unassigned IP addresses of said selected core subnet based on said address demand value; and
   e) for each customer requested subnet, assigning a subnet and a corresponding IP address size using said particular predefined subnet.

2. A method as recited in claim 1 wherein said network address space comprises a 10.x/8-bit prefix private IP address space.

3. A method as recited in claim 1 wherein each top-level subnet has 32,768 IP addresses, and wherein said particular predefined subnet has one of 32,768 IP addresses, 16,384 addresses, 8192 IP addresses, 4096 IP addresses, 2048 IP addresses, 1024 IP addresses, and 512 IP addresses.

4. A method as recited in claim 1 further comprising:
   if said selected core subnet does not have sufficient capacity, selecting a second core subnet; and
   repeating said determining said address demand value, said selecting said particular predefined subnet, and said assigning.

5. A method as recited in claim 1 wherein said adjusted address size represents a lowest power of 2 that is larger than or equal to a product of said requested address size and said first expansion factor.

6. A method as recited in claim 1 wherein said address demand value represents a lowest power of 2 that is larger than or equal to a product of said unadjusted address demand value and said second expansion factor.

7. A method as recited in claim 1 further comprising:
   if said particular predefined subnet does not have sufficient capacity, multiplying said address demand value by two to generate a doubled address demand value;
   selecting a second predefined subnet of said selected core subnet based on said doubled address demand value; and
   for each customer requested subnet, assigning said subnet and said corresponding IP address size using said second predefined subnet.

8. A computer-readable medium comprising computer-executable instructions stored therein for performing a method of allocating Internet Protocol (IP) addresses to a customer of an Internet Data Center (IDC), comprising:
   a) receiving at least one customer requested subnet associated with said customer, each customer requested subnet having a requested address size;
   b) selecting one of a plurality of core subnets in a network address space of said IDC, each core subnet partitioned into a plurality of top-level subnets, each top-level subnet partitioned into one or more predefined subnets;
   c) determining an address demand value based on said requested address size of each customer requested subnet, wherein said determining of said address demand value includes:
      for each customer requested subnet, determining an adjusted address size using said requested address size and a first expansion factor;
      adding each adjusted address size to generate an unadjusted address demand value;
      generating said address demand value using said unadjusted address demand value and a second expansion factor;
   d) selecting a particular predefined subnet having a plurality of unassigned IP addresses of said selected core subnet based on said address demand value; and
   e) for each customer requested subnet, assigning a subnet and a corresponding IP address size using said particular predefined subnet.

9. A computer-readable medium as recited in claim 8 wherein said network address space comprises a 10.x/8-bit prefix private IP address space.

10. A computer-readable medium as recited in claim 8 wherein each top-level subnet has 32,768 IP addresses, and wherein said particular predefined subnet has one of 32,768 IP addresses, 16,384 addresses, 8192 IP addresses, 4096 IP addresses, 2048 IP addresses, 1024 IP addresses, and 512 IP addresses.

11. A computer-readable medium as recited in claim 8 wherein said method further comprises:
    if said selected core subnet does not have sufficient capacity, selecting a second core subnet; and
    repeating said determining said address demand value, said selecting said particular predefined subnet, and said assigning.

12. A computer-readable medium as recited in claim 8 wherein said adjusted address size represents a lowest power of 2 that is larger than or equal to a product of said requested address size and said first expansion factor.

13. A computer-readable medium as recited in claim 8 wherein said address demand value represents a lowest power of 2 that is larger than or equal to a product of said unadjusted address demand value and said second expansion factor.

14. A computer-readable medium as recited in claim 8 wherein said method further comprises:
    if said particular predefined subnet does not have sufficient capacity, multiplying said address demand value by two to generate a doubled address demand value;
    selecting a second predefined subnet of said selected core subnet based on said doubled address demand value; and
    for each customer requested subnet, assigning said subnet and said corresponding IP address size using said second predefined subnet.

15. A computer system comprising:
    a processor; and
    a memory device coupled to said processor, wherein said memory device comprises computer-executable instructions stored therein for performing a method of allocating Internet Protocol (IP) addresses to a customer of an Internet Data Center (IDC), said method comprising:

a) receiving at least one customer requested subnet associated with said customer, each customer requested subnet having a requested address size;

b) selecting one of a plurality of core subnets in a network address space of said IDC, each core subnet partitioned into a plurality of top-level subnets, each top-level subnet partitioned into one or more predefined subnets;

c) determining an address demand value based on said requested address size of each customer requested subnet, wherein said determining of said address demand value includes:
for each customer requested subnet, determining an adjusted address size using said requested address size and a first expansion factor;
adding each adjusted address size to generate an unadjusted address demand value;
generating said address demand value using said unadjusted address demand value and a second expansion factor;

d) selecting a particular predefined subnet having a plurality of unassigned IP addresses of said selected core subnet based on said address demand value; and e) for each customer requested subnet, assigning a subnet and a corresponding IP address size using said particular predefined subnet.

16. A computer system as recited in claim 15 wherein said network address space comprises a 10.x/8-bit prefix private IP address space.

17. A computer system as recited in claim 15 wherein each top-level subnet has 32,768 IP addresses, and wherein said particular predefined subnet has one of 32,768 IP addresses, 16,384 addresses, 8192 IP addresses, 4096 IP addresses, 2048 IP addresses, 1024 IP addresses, and 512 IP addresses.

18. A computer system as recited in claim 15 wherein said method further comprises:
if said selected core subnet does not have sufficient capacity, selecting a second core subnet; and
repeating said determining said address demand value, said selecting said particular predefined subnet, and said assigning.

19. A computer system as recited in claim 15 wherein said adjusted address size represents a lowest power of 2 that is larger than or equal to a product of said requested address size and said first expansion factor.

20. A computer system as recited in claim 15 wherein said address demand value represents a lowest power of 2 that is larger than or equal to a product of said unadjusted address demand value and said second expansion factor.

21. A computer system as recited in claim 15 wherein said method further comprises:
if said particular predefined subnet does not have sufficient capacity, multiplying said address demand value by two to generate a doubled address demand value;
selecting a second predefined subnet of said selected core subnet based on said doubled address demand value; and
for each customer requested subnet, assigning said subnet and said corresponding IP address size using said second predefined subnet.

22. A method of assigning Internet Protocol (IP) addresses, comprising:
partitioning a network address space of an Internet Data Center (IDC) into a plurality of subnets each having one of a plurality of IP address sizes;
determining a customer address demand value based on one or more customer requested address sizes, each customer requested address size associated with a customer requested subnet, wherein for each customer requested subnet, said determining said customer address demand value determines an adjusted address size using said customer requested address size and a first expansion factor;
adding each adjusted address size to generate an unadjusted customer address demand value; and
generating said customer address demand value using said unadjusted customer address demand value and a second expansion factor; and
for each customer requested subnet, assigning at least a portion of a selected subnet and a corresponding IP address size based on said customer address demand value.

23. The method as recited in claim 22 wherein said network address space comprises a 10.x/8-bit prefix private IP address space.

24. The method as recited in claim 22 wherein said plurality of IP address sizes includes 32,768 IP addresses, 16,384 addresses, 8192 IP addresses, 4096 IP addresses, 2048 IP addresses, 1024 IP addresses, and 512 IP addresses.

25. The method as recited in claim 22 further comprising:
if said selected subnet does not have sufficient capacity, selecting a second subnet; and
repeating said assigning.

26. The method as recited in claim 22 wherein said adjusted address size represents a lowest power of 2 that is larger than or equal to a product of said customer requested address size and said first expansion factor.

27. The method as recited in claim 22 wherein said customer address demand value represents a lowest power of 2 that is larger than or equal to a product of said unadjusted customer address demand value and said second expansion factor.

28. The method as recited in claim 22 further comprising:
if said selected subnet does not have sufficient capacity, multiplying said customer address demand value by two to generate a doubled customer address demand value;
selecting a second subnet; and
for each customer requested subnet, assigning at least a portion of said second subnet and said corresponding IP address size based on said customer address demand value.

* * * * *